United States Patent [19]

Koch et al.

[11] 4,357,355
[45] Nov. 2, 1982

[54] NON-STICK BUBBLE GUM BASE COMPOSITION

[75] Inventors: Edwin R. Koch, Garden City; Michael Glass, Flushing, both of N.Y.

[73] Assignee: Warner-Lambert Company, Morris Plains, N.J.

[21] Appl. No.: 270,053

[22] Filed: Jun. 3, 1981

[51] Int. Cl.$^3$ .............................................. A23G 3/30
[52] U.S. Cl. ............................................ 426/4; 426/6
[58] Field of Search ........................................ 426/3-6

[56] References Cited

U.S. PATENT DOCUMENTS 3,974,293  8/1976  Witzel ..................................... 426/4
3,984,574 10/1976  Comollo ................................ 426/4
4,241,090 12/1980  Stroz ..................................... 426/4

*Primary Examiner*—Jeanette M. Hunter

*Attorney, Agent, or Firm*—Gary M. Nath; Stephen I. Miller

[57] ABSTRACT

A non-adhesive bubble gum base composition includes a high molecular weight vinyl polymer such as polyvinyl acetate or polyvinyl alcohol, together with an emulsifier, in combination with ingredients such as an elastomer, an oleaginous plasticizer, an elastomer solvent, mineral adjuvants, fatty acids, and others. The emulsifier is preferably present in an amount with respect to the non-toxic vinyl polymer ranging from about 5 to 75% by weight. A method for the preparation of the bubble gum base composition is also disclosed which comprises preparing a homogeneous premixture of the non-toxic vinyl polymer and the emulsifier prior to combining non-toxic vinyl polymer with the remainder of the ingredients of the base composition. The base compositions prepared in accordance with the present invention are less sticky, and show improved film forming and bubble blowing capabilities.

24 Claims, 2 Drawing Figures

NON-STICK BUBBLE GUM BASE COMPOSITION

BACKGROUND OF THE INVENTION

1. Field of the Invention

The present invention relates generally to bubble gum base formulations, and particularly to bubble gum base formulations that exhibit improved non-adhesive and bubble forming characteristics.

2. Description of the Prior Art

Bubble gum formulations have characteristically been sticky, because the ingredients required for good bubble formation promote adhesion. These ingredients, including gum base components such as elastomers, resins and waxes, are discussed in U.S. Pat. No. 3,984,574, relating to the preparation of purported non-tack chewing gum composition. The patent states that the combination of the foregoing ingredients in a chewing gum composition accounts for the adhesive characteristic of the gum, and suggests that these ingredients should be deleted to reduce stickiness.

An alternate approach is disclosed in U.S. Pat. No. 4,241,091, where a non-adhesive chewing gum is prepared with "slip agent" that is reported to prevent the chewing gum from sticking.

The prior art proposals require the modification of well known gum base formulations, by either the deletion of certain common and inexpensive ingredients, or the inclusion of other ingredients, in each case requiring adjustment of the gum base to assure the maintenance of desired gum characteristics. It would therefore be desirable to develop a non-adhesive bubble gum base composition that exhibits reduced stickiness while retaining the desirable characteristics of bubble gum, without the need for any substantial modifications to base formulation.

SUMMARY OF THE INVENTION

Accordingly, the present invention relates to a non-adhesive bubble gum base composition comprising the following ingredients, in amounts expressed in percent by weight:

| Ingredient | Percent |
| --- | --- |
| Elastomer | 8-20% |
| Oleaginous Plasticizer | 8-30% |
| Mineral Adjuvants | 5-25% |
| Fatty Acids | 0-20% |
| Elastomer Solvent | 10-20% |
| Non-toxic Vinyl Polymer | 20-55% |
| Emulsifiers | 3-15% |
| Antioxidant/Preservatives | 0-2% |

Preferably, the non-adhesive bubble gum base composition comprises, in weight percent:

| Ingredient | Percent |
| --- | --- |
| Elastomer | 10-16% |
| Oleaginous Plasticizer | 10-20% |
| Mineral Adjuvants | 5-15% |
| Fatty Acids | 0% |
| Elastomer Solvent | 12-18% |
| Non-toxic Vinyl Polymer | 25-35% |
| Emulsifiers | 3-15% |
| Antioxidant/Preservatives | 0-2% |

The majority of the ingredients set forth above include those materials generally utilized in gum formulation. The non-toxic vinyl polymer may comprise polyvinyl acetate, its partial hydrolyzate, polyvinyl alcohol and mixtures thereof. The non-toxic vinyl polymers used herein are those having molecular weights ranging from 38,000–94,000.

The emulsifier favorably affects the compatibility of the non-toxic vinyl polymer with the remainder of the ingredients of the gum base, and is selected from materials compatible with the non-toxic vinyl polymer. Such materials include various glyceryl derivatives, such as glyceryl monostearate, glyceryl triacetate, and others, alone or in mixtures with each other. Preferably, glyceryl triacetate is used.

In accordance with one of the features of the invention, the emulsifier is present in an amount calculated in percent by weight of the non-toxic polymer, that ranges from about 5 to about 75% and preferably from about 15 to about 60%.

The present invention in a further aspect comprises a method for preparing a bubble gum base composition comprising preparing a homogeneous premixture of the non-toxic vinyl polymer and the emulsifier, and subsequently combining the resulting homogeneous premixture with the remaining ingredients of the bubble gum base composition. Preferably, the non-toxic vinyl polymer and the emulsifier component may be combined within the amounts by weight with respect to each other set forth above.

The bubble gum composition of the present invention exhibits favorably reduced adhesion together with improved film forming characteristics. The premixture of the non-toxic vinyl polymer with an emulsifier prior to incorporation in the bubble gum base composition results in an improved uniformity in the resulting bubble gum base that has been unattainable previously.

Accordingly, it is a principal object of the present invention to provide a non-adhesive bubble gum base formulation.

It is a further object of the present invention to provide a bubble gum base formulation as aforesaid which does not require the addition of special ingredients thereto.

It is a yet further object of the present invention to provide a bubble gum base formulation as aforesaid that exhibits reduced adhesion and improved bubble forming characteristics.

It is a yet further object of the present invention to provide a method for preparing a non-adhesive bubble gum base formulation that results in a homogeneous dispersion of the ingredients thereof.

Other objects and advantages will become apparent to those skilled in the art from a consideration of the ensuing description that proceeds with reference to the following illustrative drawings.

DETAILED DESCRIPTION

Figure 1:
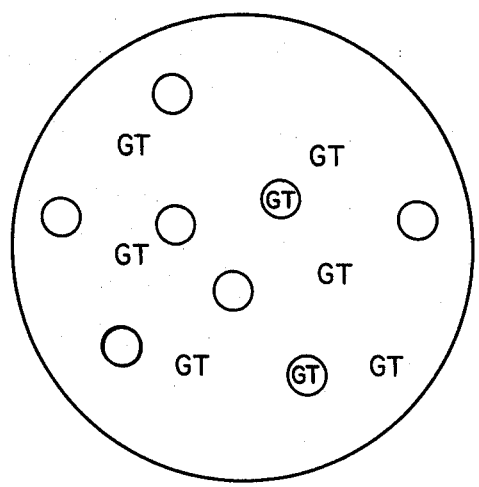
FIG. 1 is a schematic representation of certain ingredients in a bubble gum base formulation, in accordance with the prior art.

In accordance with the present invention a non-adhesive bubble gum base composition is prepared which comprises the following ingredients, expressed in percentages by weight:

| | |
|---|---|
| Elastomer | 8–20% |
| Oleaginous Plasticizer | 8–30% |
| Mineral Adjuvants | 5–25% |
| Fatty Acids | 0–20% |
| Elastomer Solvent | 10–20% |
| Non-toxic Vinyl Polymer | 20–55% |
| Emulsifiers | 3–15% |
| Antioxidant/Preservatives | 0–2% |

The elastomers useful in the present bubble gum base composition, include those elastomers normally included in gum bases. Thus, included elastomers comprise synthetic gums or elastomers such as butadiene-styrene copolymers, polyisobutylene and isobutylene-isoprene copolymers; natural gums or elasomers such as chicle, natural rubber, jelutong, balata, guttapercha, lechi caspi, sorva or mixtures thereof. Among these butadiene-styrene copolymer, polyisobutylene, isobutylene-isoprene copolymer or mixtures thereof are preferred.

The oleaginous plasticizers useful in accordance with the present invention include hydrogenated vegetable oils, cocoa butter, natural waxes, petroleum waxes such as the polyethylene waxes, paraffin waxes, and microcrystalline waxes with melting points higher than 80° C.; or mixtures thereof.

The mineral adjuvants added to the present gum base composition include materials such as calcium carbonate, magnesium carbonate, alumina, talc, tricalcium phosphate and the like; as well as mixtures thereof.

When utilized in the present composition, the fatty acids may include stearic acid, palmitic acid, oleic acid and the like; and mixtures thereof.

The elastomer solvent may include terpene resins such as polymers of α-pinene or β-pinene; rosin derivatives including hydrogenated and partially hydrogenated derivatives, such as the glycerol ester of polymerized rosin, alcohol esters of rosin such as the glycerol ester of hydrogenated rosin, the pentaerythritol ester of partially hydrogenated rosin, the glycerol esters of partially hydrogenated rosin, the glyceryl ester of rosin and mixtures thereof.

As noted earlier, the non-toxic vinyl polymers useful in the present base compositions comprise polyvinyl acetate and its partial hydrolyzate, polyvinyl alcohol, and mixtures thereof. Preferably, the vinyl polymer possess a molecular weight ranging from about 38,000 to about 94,000, and preferably from 40,000–75,000. In a most preferred range, the molecular weight of the non-toxic vinyl polymer ranges from 45,000–65,000.

The emulsifiers compatible with the non-toxic vinyl polymer include lecithin, glyceryl monostearate, fatty acid monoglycerides, diglycerides and triglycerides, glyceryl triacetate, propylene glycol monostearate and mixtures thereof. Preferably, glyceryl triacetate is utilized, and in particular is mixed with the non-toxic vinyl as described later on below.

The antioxidants and preservatives may include those materials conventionally utilized in gum compositions, such as butylated hydroxyanisole, butylated hydroxytoluene, propyl gallate and the like.

Preferably, the non-adhesive gum base composition of the present invention comprises the foregoing ingredients in the following percentages expressed by weight:

| | |
|---|---|
| Elastomer | 10–16% |
| Oleaginous Plasticizer | 10–20% |
| Mineral Adjuvants | 5–15% |
| Fatty Acids | 0% |
| Elastomer Solvent | 12–18% |
| Non-toxic Vinyl Polymer | 25–35% |
| Emulsifiers | 3–15% |
| Antioxidant/Preservatives | 0–2% |

In a further aspect of the present invention, a method for preparing the bubble gum base composition is employed, which comprises preparing a homogeneous premixture of the non-toxic vinyl polymer and the emulsifier, and subsequently combining the resulting premixture with the remaining ingredients of the base composition. The employment of a two-step mixing procedure has been disclosed in U.S. Pat. No. 4,187,320, incorporated herein by reference. The present method distinguishes the patent, however, in that the specific ingredients combined comprise the non-toxic polymer and the emulsifier, and these ingredients are homogeneously combined within certain ranges with respect to each other.

Particularly, the amount of emulsifier employed in relation to the non-toxic vinyl polymer may range from about 5 to about 75% by weight of the latter, and preferably from about 10 to about 35% by weight. The preparation of a homogeneous mixture of the respective ingredients within these has been found to result in the preparation of a premix having desired properties suitable both for chewing and bubble formation.

Also, the non-toxic vinyl polymer is generally incompatible with the remaining ingredients of the gum base formulation. The preparation of the premixture in accordance with the present invention, however, reduces the extent of this incompatability, so that a more consistent gum base composition results. Referring now to FIG. 1, a gum base composition is illustrated schematically, and it can be seen that the non-toxic vinyl polymer, represented by the circles, resides in broad dispersion, and in isolation from the remaining ingredients of the gum base. The symbol "GT", representing the emulsifier, is also seen for the most part, to be separate from both the non-toxic vinyl polymer and the remaining gum base ingredients, with isolated inclusions of emulsifier within the polymer. It is graphically apparent that the non-toxic vinyl polymer does not derive the needed plasticity from the presence of the emulsifier, while the latter resides within the remaining ingredients of the gum base and, in some instances, is reported to deleteriously affect the film forming characteristics of the entire base composition by providing excessive plasticity thereto.

Figure 2:
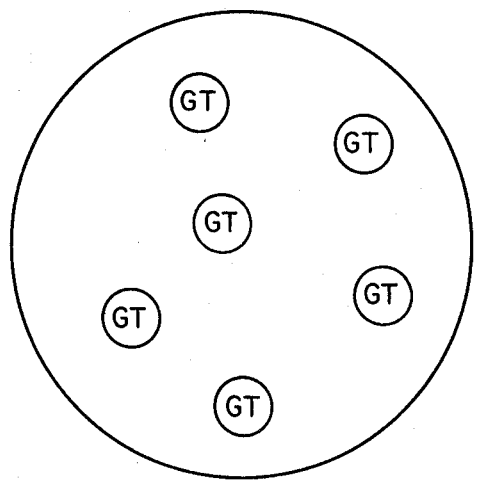
FIG. 2 is a view similar to FIG. 1, illustrating the disposition of the same ingredients, in the bubble gum base formulation of the present invention.

By contrast, the schematic representation of FIG. 2, shows the emulsifier combined in homogeneous fashion with the non-toxic vinyl polymer, in the premixture which, like the vinyl polymer shown in FIG. 1, is dispersed throughout the gum base composition. In the FIG. 2 illustration, however, the emulsifier remains in admixture with the non-toxic vinyl polymer, and modifies only the characteristics of the latter, without exerting any deleterious effect upon the remaining ingredients of the gum base. Thus, the non-toxic vinyl polymer is softened and thereby enjoys improved properties for use as an ingredient in a gum formulation, and is believed to enhance the film forming capabilities of the gum base.

In one embodiment, the present method may be practiced by thoroughly and homogeneously mixing a non-toxic vinyl polymer such as polyvinyl acetate, with the emulsifier, which may be glyceryl triacetate. The present method may follow the two-stage procedure outlined in U.S. Pat. No. 4,187,320, referred to earlier.

The premixture may be prepared by initially softening the non-toxic vinyl polymer by agitating it alone in a high shear mixer for a period of time of about twenty minutes, after which the emulsifier may be added incrementally and stepwise while the resulting mixture is sheared for a further approximately equivalent time. The foregoing procedure has been found to yield a favorably homogeneous premixture.

The preparation of the bubble gum base composition includes the addition of the remaining ingredients, comprising the elastomer, the elastomer solvent, the oleaginous plasticizers and other additives. The homogeneous premixture may either be added to a mixture of these other ingredients, or the reverse may be conducted.

The preparation of the rest of the bubble gum base composition may proceed by subjecting the elastomer to high shear mixing for a period of time, which may range on the order of twenty-five minutes, at which point the elastomer solvent may be added in stepwise increments over a total period that may range to approximately one and one half hours. Oleaginous materials such as partially hydrogenated cottonseed and soybean oils may be thereafter consecutively added in stepwise increments while the mixture may be further agitated for a period of about thirty minutes.

At this point, the combination of the homogeneous premixture and the mixture of the foregoing gum base ingredients may take place under high shear, as noted earlier, by the addition of either mixture to the other. Following this combination, the resulting mixture is preferably further mixed for a period of about thirty minutes, after which additional elastomer may be added and the resulting mixture agitated for a further period of about twenty minutes, after which the mineral adjuvant may be added and the entire mixture agitated for a further period of about ten minutes. Finally, the oleaginous plasticizer is added and the mixture is agitated for about one hour, at which point a homogeneous gum base has been prepared.

Naturally, the details of the method set forth above are presented for purposes of illustration, and to provide a best mode for the practice of the invention. Modification in the foregoing parameters may be made, within the scope of the present invention, and the invention should not be limited to the parameters set forth above.

The following examples represent several illustrative formulations of bubble gum base compositions in accordance with the present invention.

EXAMPLE I

A bubble bum base composition was prepared with the following ingredients, and in amounts expressed in parts by weight.

| | Parts by Weight |
|---|---|
| Butadiene Styrene Copolymer | 14 |
| Calcium Carbonate | 10 |
| Microcrystalline Wax | 12 |
| Mono and Diglycerides of Fatty Acids | 5 |
| Hydrogenated Soybean Oil | 10 |
| Partially Hydrogenated Cottonseed and Soybean Oil | 8 |

-continued

| | Parts by Weight |
|---|---|
| Polyvinyl Acetate (Hmwt) | 20 |
| Glyceryl Triacetate | 6 |
| Glyceryl Ester of Partially Hydrogenated Wood Rosin | 15 |

The polyvinyl acetate and the glyceryl triacetate were prepared separately as a homogeneous premixture, by the techniques discussed earlier. This premixture, was then added to a mixture of the remaining ingredients, in the manner all set forth earlier.

The following formulations were prepared in a similar fashion, and the specific ingredients and their amounts, expressed in parts by weight, are set forth below.

EXAMPLE II

| | Parts by Weight |
|---|---|
| Polyisobutylene | 18 |
| Polyvinyl Acetate (Hmwt) | 52 |
| Glyceryl Triacetate | 8 |
| Mono and Diglycerides of Fatty Acids | 4 |
| Antioxidant | 0.1 |
| Calcium Carbonate | 5 |
| Lecithin | 3 |
| Glyceryl Ester of Partially Hydrogenated Wood Rosin | 10 |

EXAMPLE III

| | Parts by Weight |
|---|---|
| Polyisobutylene | 10 |
| Isobutylene-isoprene Copolymer | 8 |
| Glyceryl Triacetate | 3 |
| Mono and Diglycerides of Fatty Acids | 5 |
| Calcium Carbonate | 12 |
| Lecithin | 3 |
| Polyvinyl Acetate (Hmwt) | 47 |
| Glyceryl Ester of Hydrogenated Rosin | 12 |
| Antioxidant | 0.1 |

EXAMPLE IV

| | Parts by Weight |
|---|---|
| Butadiene Styrene Copolymer | 9 |
| Polyisobutylene | 5 |
| Calcium Carbonate | 8 |
| Partially Hydrogenated Soy and Cottonseed Oils | 4 |
| Hydrogenated Soybean Oil | 7 |
| Lecithin | 3 |
| Polyvinyl Acetate | 29 |
| Glyceryl Ester of Partially Hydrogenated Rosin | 16 |
| Microcrystalline Wax | 10 |
| Glyceryl Triacetate | 4 |
| Mono and Diglycerides of Fatty Acids | 5 |
| Antioxidant | 0.1 |

EXAMPLE V

| | Parts by Weight |
|---|---|
| Butadiene Styrene Copolymer | 10 |
| Polyisobutylene | 10 |
| Talc | 25 |

-continued

| | Parts by Weight |
|---|---|
| Hydrogenated Soybean Oil | 10 |
| Polyvinyl Acetate (Hmwt) | 20 |
| Glyceryl Ester of Partially Hydrogenated Rosin | 10 |
| Paraffin Wax | 4 |
| Microcrystalline Wax | 4 |
| Lecithin | 3 |
| Glyceryl Triacetate | 3 |
| Mono and Diglycerides of Fatty Acids | 2 |

EXAMPLE VI

| | Parts by Weight |
|---|---|
| Polyisobutylene | 18% |
| Polyvinyl Acetate (Hmwt) | 52% |
| Glyceryl Triacetate | 5 |
| Paraffin Wax | 5 |
| Mono and Diglycerides of Fatty Acids | 4 |
| Antioxidant | 0.1 |
| Calcium Carbonate | 5 |
| Lecithin | 3 |
| Glyceryl Ester of Partially Hydrogenated Wood Rosin | 5 |
| Microcrystalline Wax | 3 |

It can be seen from the above examples, that a variety of ingredients may be added to the bubble gum base composition, including two or more different ingredients comprising emulsifiers. In such instance, one of the two may be utilized in the preparation of the premixture with the non-toxic vinyl polymer, while the other may be directly added to the final base composition. In all of the examples, the polyvinyl acetate utilized possessed a molecular weight falling within the broad ranges set forth herein, i.e. 38,000-94,000.

The present bubble gum base compositions may be formulated into a variety of bubble gum products utilizing standard procedures and equipment. Thus, a bubble gum may be prepared by combining additional ingredients, such as sweeteners, flavors, softeners, and a colorant, if desired. Both sugar sweetened and sugarless bubble gum formulations may be prepared. For example, a sugar sweetened bubble gum formulation may contain the following ranges of ingredients.

| Ingredients | Percent by Weight |
|---|---|
| Bubble Gum Base | 16-20 |
| Corn Syrup | 18-26 |
| Sugar | 50-65 |
| Flavor | 0.5-2 |
| Softeners | 0.5-2 |
| Color | Trace |

An artificially sweetened bubble gum formulation may contain the following ingredients and amounts.

| Ingredients | Percent by Weight |
|---|---|
| Bubble Gum Base | 16-32 |
| Sugar Alcohols | 50-70 |
| Artificial Sweeteners | 0-1 |
| Flavor | 0.8-2 |
| Softeners | 0-6 |
| Color | Trace |
| Binder | 0-5 |
| Filler | 0-3 |

The bubble gum composition contains a large amount of a sweetener, which, in the instance of sugar sweetened bubble gum, comprises sugar, including sucrose, glucose (corn syrup), dextrose, invert sugar, fructose, and mixtures thereof. In the instance where a sugarless bubble gum is prepared, the sweetener comprises a sugar substitute, including saccharin and its various salts such as the sodium or calcium salts, cyclamic acid and its various salts such as the sodium salt, the dipeptide sweeteners such as aspartame; dihydrochalcone; glycyrrhizin; *Stevia rebaudiana* (Stevioside); and sugar alcohols such as sorbitol, sorbitol syrup, mannitol, xylitol, and the like. Also, the nonfermentable sugar substitute (hydrogenated starch hydrolysate) described in U.S. Pat. No. Re. 26,959, may be utilized, as well as the synthetic sweetener 3,4-dihydro-6-methyl-1,2,3-oxathiazin-4-one-2,2-dioxide, including its potassium, sodium and calcium salts, all described in German Pat. No. 2,001,017.7. Any of the foregoing sweeteners may be present alone or in combination with each other, within the scope of the present invention.

Useful flavors include the essential oils or synthetic flavors or mixtures thereof. Flavors include artificial and synthetic fruit flavors, cinnamon, wintergreen, spearmint, peppermint, birch, anise and the like, with natural fruit flavors derived from essence of fruits such as apple, pear, peach, strawberry, apricot, orange, watermelon, banana and the like. Generally, the flavors account for up to about 1% by weight of the total composition.

The bubble gum compositions also may contain softeners or plasticizers, such as those materials set forth earlier. In addition, materials such as corn syrup, sugar alcohols such as sorbitol, mannitol and xylitol as well as materials such as hydrolyzed cereal solids are contemplated and may be included herein.

Bubble gum utilizing the base of the present invention may be prepared in a variety of known forms. For example, cube-shaped bubble gum may be prepared by adding the present gum base at a temperature of about 90° to about 100° C. to a slightly heated kettle (30° C.). Thereafter, the sweetener, such as corn syrup is added together with a quantity of softeners, and the batch is thereafter mixed for four minutes. Additional sweetener in the form of sugar is added together with the remainder of the softeners, flavoring and colorant if desired, and the batch is thereafter mixed for seven minutes and subsequently is available for formation into the final shape of the gum. In the instance where center-filled sugar containing bubble gum is to be prepared, the foregoing procedure is generally followed.

The preparation of sugarless bubble gum in slab form comprises a partial addition of sorbitol to the bubble gum base, followed by mixture of these ingredients for about two minutes. Thereafter, water, sorbitol and part of the total softener content is added, and the batch is thereafter mixed for about six minutes. A further addition of sorbitol is made, followed by an additional increment of softeners and water, and the resulting batch is mixed for about five minutes. Finally, flavoring and colorants are added and the composition is mixed for a further five minutes, and the resulting compositions may be formed into a slab by known techniques. This procedure is likewise followed in the instance where sugarless bubble gum in stick form is to be prepared.

Sugarless center-filled gum may be prepared by combining the present bubble gum base with gum arabic, cellulose gum, sorbitol and water and mixing these ingredients together for about four minutes. Thereafter, the remainder of the sorbitol, together with mannitol, flavoring, softener and colorant are added to the batch, and the resulting composition is mixed for seven minutes, at which time the composition is ready for formation into center-filled gum.

The following examples are illustrations of representative bubble gum compositions that may be prepared in the manner outlined above.

EXAMPLE VII

Bubble Gum

|  | Parts by Weight |
| --- | --- |
| Gum Base | 17.00 |
| Corn Syrup | 25.00 |
| Softeners | 4.00 |
| Sugar | 53.00 |
| Flavor | 0.70 |
| Color | Trace |

EXAMPLE VIII

Sugarless Bubble Gum

|  | Parts by Weight |
| --- | --- |
| Gum Base | 24.00 |
| Sorbitol | 65.00 |
| Water | 6.00 |
| Softener | 0.50 |
| Flavor | 1.00 |
| Color | Trace |
| Calcium Carbonate | 3.00 |
| Color | Trace |

EXAMPLE IX

Sugarless Center-Filled Bubble Gum

|  | Parts by Weight |
| --- | --- |
| Gum Base | 18.00 |
| Gum Arabic | 3.00 |
| Sodium Carboxy Methyl Cellulose | 0.10 |
| Mannitol | 16.00 |
| Sorbitol | 47.00 |
| Water | 5.00 |
| Flavor | 1.20 |
| Softener | 7.00 |
| Color | Trace |

EXAMPLE X

Center-Filled Bubble Gum

|  | Parts by Weight |
| --- | --- |
| Gum Base | 16% |
| Corn Syrup | 26% |
| Sugar | 52% |
| Softeners | 3.5% |
| Flavor | 0.7% |
| Color | Trace |
| Water | 1.00% |

EXAMPLE XI

Sugarless Bubble Gum

|  | Parts by Weight |
| --- | --- |
| Gum Base | 23% |
| Sorbitol | 64% |
| Mannitol | 2% |
| Calcium Carbonate | 2% |
| Softeners | 4% |
| Water | 4% |
| Flavor | 1% |
| Color | Trace |

Bubble gums when prepared according to the present invention possess nonstick characteristics and improved film forming characteristics as well. In particular, the present bubble gums that have demonstrated a reduced tendency to adhere to the skin, such as in the instance where a bubble has been blown and broken, and are also less adherent to natural tooth surfaces, fillings, and denture materials.

In order to evaluate the adhesive characteristics of the bubble gums of the present invention, compositions representative of the foregoing examples were formulated as bubble gums, and were evaluated by human panel testing, as will be subsequently explained.

Two series of panel tests were conducted; a total of twenty-five male and female subjects between the ages of ten and eighteen years participated in the first study, while twenty-seven similar subjects with similar qualifications participated in the second study. In both studies, the subjects were able to blow bubbles of at least three inches in diameter.

The subjects reported to the testing location where they were familiarized with the procedure and the evaluation scale was explained to them. Each panel tested approximately four bubble gum formulations, and individual panel members were assigned to one of the bubble gum formulations according to a random code. The panel members were instructed to chew the assigned bubble gum until it became soft enough for bubble blowing.

Each panel member blew a large bubble at least three inches in diameter, and allowed it to burst so as to have the gum come in contact with the face. If the bubble did not break on its own, the panel member was instructed to quickly pop it. The gum was then peeled from the face, and the panel member noted the degree of stickiness on an evaluation sheet utilizing the following scale.

A rating of zero indicated that the gum did not stick. A rating of one indicated that the gum gave a sticky feeling on the face after it was peeled off. A rating of two indicated that the gum stretched as it was pulled off. A rating of three indicated that pieces of gum remained on the face but were easily removed. A rating of four indicated that pieces of gum remained on the face but were difficult to remove.

Each panel member evaluated three bubbles blow from each of the bubble gum formulations tested and crossed over immediately to the remaining formulations according to a random code. In order to maintain a normal situation, no attempt was made to further cleanse the face after removal of the residual gum.

At the same time that the panel members were peeling off gum samples, an observing investigator gave an objective evaluation of the degree of sticking and recorded this evaluation on a separate sheet. The scale used by the panel members and by the investigators was similar, with the exception that the score of 1.0 utilized by the investigator was changed in description to "sticks but pulls off easily".

The ratings were treated statistically, and the results of the tests are set forth in the following tables.

TABLE I

EVALUATION OF BUBBLE GUM FACIAL STICKING - FIRST PANEL

| | PANEL MEMBER EVALUATION | INVESTIGATOR EVALUATION |
|---|---|---|
| Bubble Gum A | .407 | .198 |
| Bubble Gum B | .420 | .296 |
| Bubble Gum C (prior art) | 1.240 | 1.000 |
| Bubble Gum D (competitive gum) | .605 | .370 |
| Bubble Gum E (competitive gum) | .513 | .383 |

TABLE II

EVALUATION OF BUBBLE FACIAL STICKING - SECOND PANEL

| | PANEL MEMBER EVALUATION | INVESTIGATOR EVALUATION |
|---|---|---|
| Bubble Gum F | .360 | .253 |
| Bubble Gum G | .560 | .373 |
| Bubble Gum H (competitive gum) | .653 | .667 |
| Bubble Gum I (competitive gum) | .653 | .413 |

From a review of the tests performed by each panel, it is apparent that the bubble gum formulations of the present invention were less sticky than those of the prior art and competitive formulations. In particular, each series of evaluations, both those of the panel members, and those of the investigators, compared to each other, indicate this to be the case.

This invention may be embodied in other forms or carried out in other ways without departing from the spirit or essential characteristics thereof. The present invention is therefore to be considered as in all respects illustrative and not restrictive, the scope of the invention being indicated by the appended claims, and all changes which come within the meaning and range of equivalency are intended to be embraced therein.

What is claimed is:

1. A non-adhesive bubble gum base composition, said base composition comprising, in weight percent:

| Elastomer | 8-20% |
|---|---|
| Oleaginous Plasticizer | 8-30% |
| Mineral Adjuvants | 5-25% |
| Fatty Acids | 0-20% |
| Elastomer Solvent | 10-20% |
| Antioxidant/Preservative | 0-2% | and
 a homogeneous premixture of a non-toxic vinyl polymer having a molecular weight ranging from about 38,000 to about 94,000 and at least a portion of an emulsifier, said non-toxic vinyl polymer present in said base composition in an amount by weight thereof, of from 20% to 55%, and said emulsifier present in said base composition in an amount by weight thereof, of from 3% to 15%, and
 wherein said emulsifier is present in an amount ranging from about 5% to about 75% by weight of said non-toxic vinyl polymer.

2. The bubble gum base composition of claim 1 comprising in weight percent:

| Elastomer | 10-16% |
|---|---|
| Oleaginous Plasticizer | 10-20% |
| Mineral Adjuvants | 5-15% |
| Elastomer Solvents | 12-18% |
| Antioxidant/Preservative | 0-2% | and
 a homogeneous premixture of a non-toxic vinyl polymer having a molecular weight ranging from about 38,000 to about 94,000 and at least a portion of an emulsifier, said non-toxic vinyl polymer present in said base composition in an amount by weight thereof, of from 25% to 35%, and said emulsifier present in said base composition in an amount by weight thereof, of from 3% to 15%, and
 wherein said emulsifier is present in an amount ranging from about 5% to about 75% by weight of said non-toxic vinyl polymer.

3. The bubble gum base composition of either claims 1 or 2 wherein said non-toxic vinyl polymer is selected from polyvinyl acetate, polyvinyl alcohol and mixtures thereof.

4. The bubble gum base composition of either claims 1 or 2 wherein said molecular weight ranges from about 40,000 to about 75,000.

5. The bubble gum base composition of either claims 1 or 2 wherein said emulsifier is selected from the group consisting of lecithin, glyceryl monostearate, fatty acid monoglycerides, fatty acid diglycerides, fatty acid triglycerides, glyceryl triacetate, propylene glycol monostearate, and mixtures thereof.

6. The bubble gum base composition of claim 3 wherein said emulsifier is selected from the group consisting of lecithin, glyceryl monostearate, fatty acid monoglycerides, fatty acid diglycerides, fatty acid triglycerides, glyceryl triacetate, propylene glycol monostearate, and mixtures thereof.

7. The bubble gum base composition of either claims 1 or 2 wherein said emulsifier is present in an amount ranging from about 10% to about 35%, based on the weight of said non-toxic vinyl polymer present.

8. The bubble gum base composition of claim 3 wherein said emulsifier is present in an amount ranging from about 10% to about 35%, based on the weight of said non-toxic vinyl polymer present.

9. A method for preparing a nono-adhesive bubble gum base composition comprising;
 preparing a homogeneous premixture under high speed shearing, of a non-toxic vinyl polymer having a molecular weight ranging from about 38,000 to about 94,000, and at least a portion of an emulsifier, said emulsifier present in an amount ranging from about 5% to about 75% by weight of said non-toxic vinyl polymer, and
 combining said premixture with the remaining ingredients of said base composition, said remaining ingredients comprising,
 an elastomer ranging in an amount by weight of said base composition, of from 8% to 20%, an oleaginous plasticizer ranging in an amount by weight of said base composition, of from 8% to 30%, mineral adjuvants ranging in an amount by weight of said base composition, of from 5% to 25%, and an elastomer solvent in an amount by weight of said base composition, of from 10% to 20%.

10. The method of claim 9 wherein said non-toxic vinyl polymer is selected from the group consisting of polyvinyl acetate, polyvinyl alcohol, and mixtures thereof.

11. The method of claim 9 or 10 wherein said molecular weight ranges from about 40,000 to about 75,000.

12. The method of either claims 9 or 10 wherein said emulsifier is selected from the group consisting of lecithin, glyceryl monostearate, fatty acid monoglycerides, fatty acid diglycerides, fatty acid triglycerides, glyceryl triacetate, propylene glycol monostearate, and mixtures thereof.

13. The method of claim 9 or 10 wherein said emulsifier is present in an amount ranging from about 10% to about 35%, based on the weight of said non-toxic vinyl polymer present.

14. The method of claim 12 wherein said emulsifier comprises glyceryl triacetate.

15. The method of claim 14 wherein said emulsifier is present in an amount ranging from about 10% to about 35%, based on the weight of said non-toxic vinyl polymer present.

16. The method of either claims 9 or 10 wherein said non-toxic vinyl polymer is initially subject to said high shear mixing alone, and said emulsifier is added incrementally thereto under continued high shear mixing.

17. The method of either claims 9 or 10 wherein said premixture is added to a mixture of the remaining ingredients of said base composition.

18. The method of either claims 9 or 10, wherein the remaining ingredients of said base composition are added to said homogeneous premixture.

19. The method of claim 17 wherein said combining step is performed under agitation.

20. The method of claim 18 wherein said combining step is performed under agitation.

21. The method of either claims 9 or 10 wherein said base composition further includes one or more fatty acids, and antioxidant/preservatives.

22. The method for preparing a non-adhesive bubble gum formulation, comprising providing the bubble gum base formulation of claim 1, and combining therewith one or more ingredients selected from the group consisting of flavorings, colorants, sweeteners, bulking agents, softeners, and mixtures thereof.

23. The method of claim 22 wherein said sweeteners include sugar, and said bubble gum is sugar containing.

24. The method of claim 22 wherein said sweeteners comprise sugar substitutes, and said bubble gum is artificially sweetened.

* * * * *